United States Patent [19]

Takee et al.

[11] Patent Number: 5,468,260
[45] Date of Patent: Nov. 21, 1995

[54] HYDROGEN-ABSORBING ALLOY FOR NEGATIVE ELECTRODE

[75] Inventors: Masao Takee; Mamoru Kimoto; Yoshito Tikano; Husago Mizitaki; Yoshinori Mastuura; Koji Nishio; Nobohiro Furukawa, all of Osaka, Japan

[73] Assignee: Sanyo Electric Co., Ltd., Osaka, Japan

[21] Appl. No.: 352,722

[22] Filed: Dec. 2, 1994

Related U.S. Application Data

[62] Division of Ser. No. 26,462, Mar. 4, 1993, abandoned.

[30] Foreign Application Priority Data

Mar. 5, 1992 [JP] Japan .................................. 4-048697

[51] Int. Cl.$^6$ .................................................. H01M 4/04
[52] U.S. Cl. ........................... 29/623.5; 429/59; 429/101; 429/218; 420/900; 420/455
[58] Field of Search ............................. 429/59, 101, 218; 420/455, 900; 29/623.4, 623.5, 623.1

[56] References Cited

U.S. PATENT DOCUMENTS

| | | | |
|---|---|---|---|
| 4,487,817 | 12/1984 | Willems et al. | 429/27 |
| 5,008,164 | 4/1991 | Furukawa et al. | 429/59 |
| 5,071,720 | 12/1991 | Notten | 429/101 |
| 5,135,589 | 8/1992 | Fetcenko et al. | 148/442 |
| 5,376,474 | 12/1994 | Tadokoro et al. | 429/59 |

*Primary Examiner*—Prince Willis, Jr.
*Assistant Examiner*—M. Nuzzolillo
*Attorney, Agent, or Firm*—Spensley Horn Jubas & Lubitz

[57] ABSTRACT

A hydrogen-absorbing alloy electrode having a hydrogen-absorbing alloy in a single crystal system and composed of at least three elements which are coated on a conductive substrate. One of the at least three elements has a density distribution profile with at least two adjacent high density peaks and a lowest density point between the at least two adjacent high density peaks. A density difference between one of the at least two adjacent high density peaks and the lowest density point is not less than about 3.0 wt % and a distance between the two adjacent high density peaks is not less than about 20 μm. The hydrogen-absorbing alloy has a volume of 2 μm$^3$ and may include an additive selected from a group consisting of Manganese (Mn), Boron (B), Tungsten (W) and Cobalt (co).

5 Claims, 10 Drawing Sheets

HYDROGEN-ABSORBING ALLOY FOR NEGATIVE ELECTRODE

This is a division of application Ser. No. 08/026,462, filed on Mar. 4, 1993, now abandoned.

BACKGROUND OF THE INVENTION

1. Field of the Invention

This invention relates to a hydrogen-absorbing alloy for use as a negative electrode in an alkaline storage battery.

2. Description of the Prior Art

Currently, research is being carried out to develop for hydrogen-absorbing alloys for use in a battery, and which are capable of absorbing and desorbing hydrogen reversibly. Also being developed are metal hydride storage batteries which use such hydrogen-absorbing alloys for their negative electrode. Metal hydride storage batteries, when compared to conventional Ni-Cd batteries or lead acid batteries, can be lighter and have a larger capacity.

Proposed hydrogen-absorbing alloys for the negative electrode in the battery, include $LaNi_5$, $LaNi_4Co$ and $LaNi_4Cu$ such as described in Japanese patent publication 59-49671, hydrogen-absorbing alloys of an Mm-Ni type (where the "Mn", a so-called "Misch Metal" is a mixture of rare earth elements, such as La, Ce, Nd, Pr, etc.) are also being developed. These alloys produce batteries that can obtain a high capacity.

The above alloys are obtained by conventional methods, which typically produce alloys with homogeneous texture. This reduces cracking within the alloy. Therefore, when using these alloys for a negative electrode in a battery, the surface area does not increase, and there is a reduced reaction area. As a result, discharge characteristics of hydrogen desorbtion for the alloys at low temperatures deteriorate. Further, the oxygen absorbing capability of these alloys is inferior, thus, making rapid charging of the battery problematic.

In typical conventional process for manufacturing the hydrogen-absorbing alloys, each component of the alloy is measured and mixed, melted in an arc furnace in an inert argon atmosphere, and cooled. Next, the alloys are held in a vacuum furnace and heat-treated at a high temperature (approximately 1000° C.) for a fixed period of time. This is an "annealing" heat treatment which causes homogenization of the hydrogen-absorbing alloys.

To complete the electrode, the hydrogen-absorbing alloys are mechanically pulverized into granules. The granules are mixed into a paste with a conductive agent and a binder, such as powered polytetraflourethylene (PTFE). A coating of the paste is provided on a conductive substrate, such as a current collector comprising a punched metal plate. The current collector is then pressed to form the hydrogen-absorbing alloy electrode.

SUMMARY OF THE INVENTION

Accordingly, it is a primary object of an embodiment of the present invention to provide a hydrogen-absorbing alloy electrode with improved electrode characteristics, such as improved discharge characteristics in low temperatures.

Another object of an embodiment of the present invention is to provide a hydrogen-absorbing alloy electrode with improved electrode characteristics, such as improved high-rate charge characteristics in the low temperatures.

Still another object of an embodiment of the present invention is to provide a hydrogen-absorbing alloy electrode with a large discharge capacity.

The above objects are fulfilled by a hydrogen-absorbing alloy electrode according to an embodiment of the present invention which comprises a conductive substrate and a hydrogen-absorbing alloy in a single crystal system which is composed of at least three elements. One of the at least three elements has a density distribution profile with at least two adjacent high density peaks and a lowest density point between the at least two adjacent high density peaks. The density difference between one of the at least two adjacent high density peaks and the lowest density point is not less than about 3.0 wt %. Further, the distance between the two adjacent high density peaks is not less than about 20 μm. The hydrogen-absorbing alloy is coated onto the conductive substrate.

The hydrogen-absorbing alloys may have a volume of about 2 $\mu m^3$ and may include an additive selected from a group consisting of Manganese (Mn), Boron (B), Tungsten (W) and Cobalt (Co). Further, the single crystal system of the alloy may be a hexagonal system and the alloy may have a non-stoichiometric composition.

The hydrogen-absorbing alloys are obtained through cooling the alloy until a nucleus formation temperature is reached at a first cooling speed and then quenching at a second cooling speed which is faster than the first cooling speed. In the hydrogen-absorbing alloy embodiments, the nucleus formation temperature may range from about 1200° C. to about 1300° C. The second cooling speed may be larger than 500° C./min. On the other hand, both the first cooling speed and the second cooling speed may be smaller than about 300° C./min to facilitate nucleus formation.

In this invention, the hydrogen-absorbing alloy may include the rare earth system hydrogen-absorbing alloy, the titanic system hydrogen-absorbing alloy or the alkali soil system hydrogen-absorbing alloy. The rare earth system hydrogen-absorbing alloy may preferably be composed of Mm (Misch metal), Cobalt (Co), Nickel (Ni) and Manganese (Mn). Such alloy shall be represented by a formula ANiaCobMnc or ANiaCobMncXd, wherein the "A" is Mm (Misch metal) or a mixture of rare earth elements including Lanthanum (La) Further, ranges of "a", "b", "c" and "d" are respectively defined by $2.5 \leq a \leq 3.5$, $0 \leq b \leq 1.5$, $0 \leq c \leq 1.0$ and $0 < d \leq 0.3$. Additionally a range of Lanthanum is selected from 20% to 50%. In the formula ANiaCobMnc, a value of a+b+c is 3.85 to 5; and in the formula ANiaCobMncXd, a value of a+b+c+d is 3.85 to 5, and the "X" is an element selected from a group of Iron (Fe), Copper (Cu), Molybdenum (Mo), Tungsten (W), Boron (B), Aluminum (Al), Silicon (Si) and Tin (Sn).

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE PREFERRED EMBODIMENT

The following detailed description is of the best presently contemplated mode of carrying out the invention by the inventors. This description should not to be taken in a limiting sense, but is made merely for the purpose of illustrating general principles of embodiments of the invention. The scope of the invention is best defined by the appended claims.

The hydrogen-absorbing alloys according to embodiments of the present invention composed of at least three elements. However, the crystal structure of the alloys are mainly in a single crystal system. One of the at least three elements is partially condensed in an alloy mixture, and high density portions may be obtained. One of the three elements is measured with EPMA (Electron Probe Micro Analysis), which provides a density distribution profile with at lest two adjacent high density peaks and a lowest density point between the at least two adjacent high density peaks. One of the three elements has a density difference between one of the at least two adjacent high density peaks and the lowest density point of not less than about 3.0 wt %. Further, the distance between the two adjacent high density peaks is not less than about 20 μm. This distance is defined by a real length between the two adjacent high density peaks measured by EPMA method. This distance in embodiments of the present invention has the same meaning as a density pitch which is defined in this specification.

The above hydrogen-absorbing alloy may be in a single crystal system. However, components of portions of the alloy are different. Accordingly, equilibrium-pressure difference from absorbing hydrogen between two portions of the alloy may be created. Further, portions having a low equilibrium-pressure can more easily absorb hydrogen. Therefore, cracks are easily created in the alloy, and the surface area of the hydrogen-absorbing alloys are increased. As a result, the reaction area is also increased.

FIRST EMBODIMENT

FIRST EXAMPLE

Figure 1:
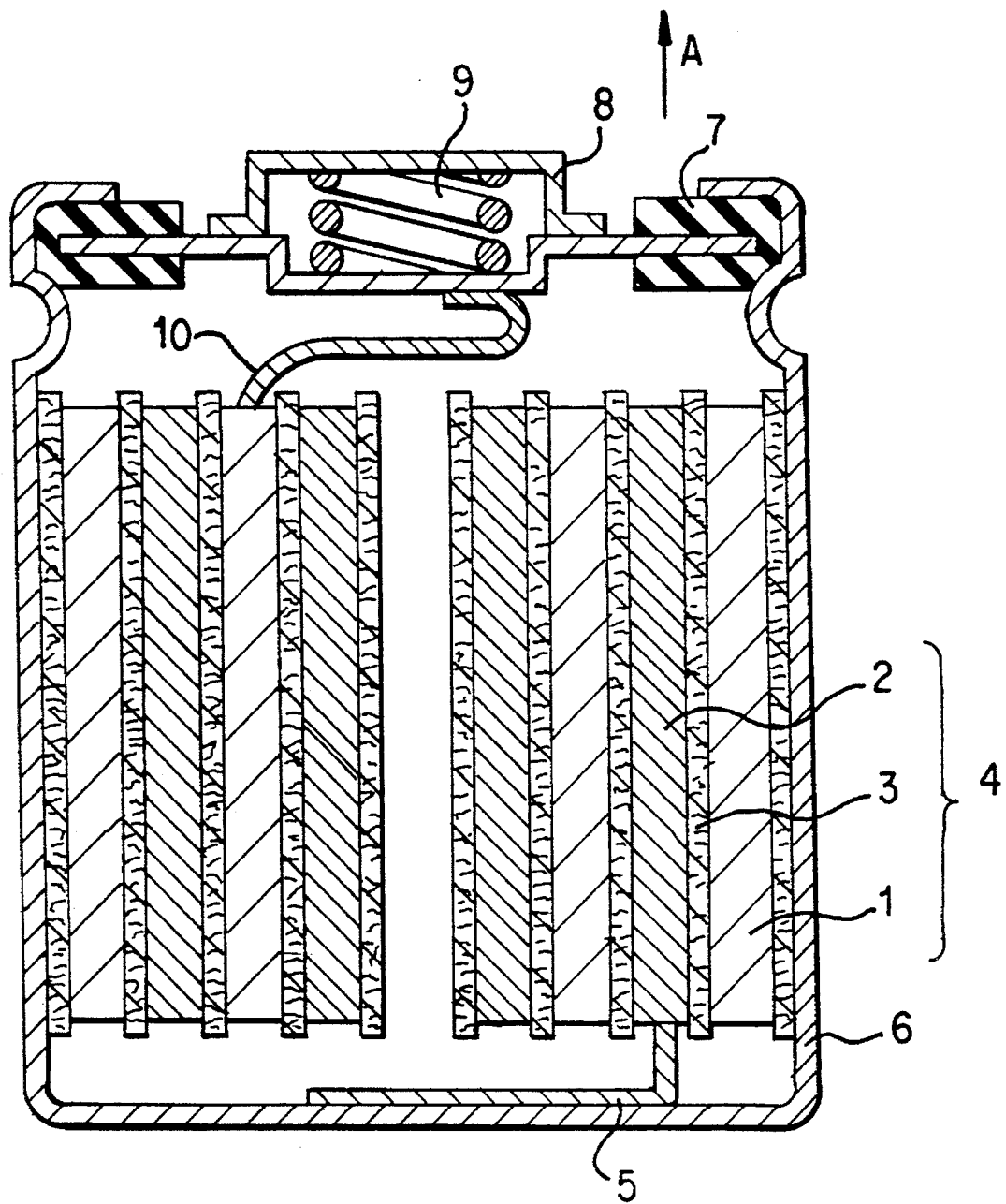
FIG. 1 is a cross-sectional illustration of a battery in accordance with an embodiment of the present invention.

In a first embodiment of the present invention, hydrogen-absorbing alloys are prepared and used to form batteries. FIG. 1 is a cross-sectional illustration of a battery according to a first embodiment of the present invention. In FIG. 1, the battery has a positive electrode 1 of a sintered type nickel hydroxide electrode, a negative electrode 2 of hydrogen-absorbing alloy and a separator 3. The separator 3 is impregnated with an alkaline electrolyte, and spirally wound to insulate the positive electrode 1 from the negative electrode 2. This forms an electrode body 4. The electrode body 4 is set in an outer case 6, which acts as a negative terminal for the battery. The outer case 6 and the negative electrode 2 are electrically connected together by a negative conductive lead 5. An opening in the outer case 6 is closed off by a cap 8 and a packing 7. Inside part of the cap 8, a coiled spring 9 is arranged. Once internal pressure in the battery increases, and the coiled spring is pressed in the direction "A". Thus, internal gas may be released into the atmosphere. The cap 8 and the positive electrode 1 are electrically connected together by a positive conductive lead 10.

The above cylindrical type metal hydrogen battery may be produced in accordance with the process described below. To prepare the hydrogen-absorbing alloy, Mm (so-called Misch Metal), Nickel (Ni), Cobalt (Co), Aluminum (Al) and Manganese (Mn) are measured in an element ratio of 1:3.2:1:0.2:0.6. These elements are then melted in a high frequency melting furnace in an argon atmosphere (or other inert atmosphere) to form a melted mixture. Next, the melted mixture is slowly cooled at less than a 50° C./min cooling speed to reach a nucleus formation temperature (ranging from about 1200° C. to about 1300° C.). Once the mixture temperature reaches less than the nucleus formation temperature, the mixture is quenched at a quenching speed ranging from 300° C./min to 500° C./min. This produces a hydrogen-absorbing alloy bulk with a composition represented by the formula $MmNi_{3.2}Co_{1.0}Al_{0.2}Mn_{0.6}$. The above produced alloy is called "a1".

The hydrogen-absorbing alloy "a1" is then mechanically pulverized into granules with an average size of 50 μm. Next, the granules are kneaded with polyethyleneoxide (PEO), water-soluble binder, to obtain a paste. The paste is applied to a punched metal conductive substrate, on both sides, and then dried to produce a negative electrode 2. The negative electrode 2 and the positive electrode 1, with the separator 3 interposed between them, are wound to produce the electrode body 4. The electrode body 4 is then inserted into the outer case 6, and a 30 wt % KOH electrolyte solution is poured into the outer case 6. Then, the outer case 6 is closed off by the cap 8 and packing 7. This produces a battery called battery "A".

SECOND EXAMPLE

A second example is similar to the above described first example, however the quenching speed is altered. The quenching speed is set higher than 500° C./min. This produces a hydrogen-absorbing alloy bulk having the same elements as described in the first example. This alloy is called "a2".

The hydrogen-absorbing alloy "a2" is used to produce a negative electrode, and then a battery "A2" using the negative electrode is prepared by the same method used in the above first example.

COMPARATIVE EXAMPLE

A comparative example is produced for comparison with the above first and second examples. To produce the comparative example, the cooling speed of both the slow-cooling and the quenching is altered. These cooling speeds are set at less than 300° C./min. This also produces a hydrogen-absorbing alloy bulk having the same elements as described in the first example. This alloy is called "x". The hydrogen-absorbing alloy "x" is used to produce a negative electrode and then a battery "X" is prepared by the same method used in the above first example.

EXPERIMENTS

Several experiments were performed on the above battery examples. The purpose was to determine the battery characteristics and to compare the battery example. Below is a description of the experiments performed.

Experiment 1-1

Figure 2:
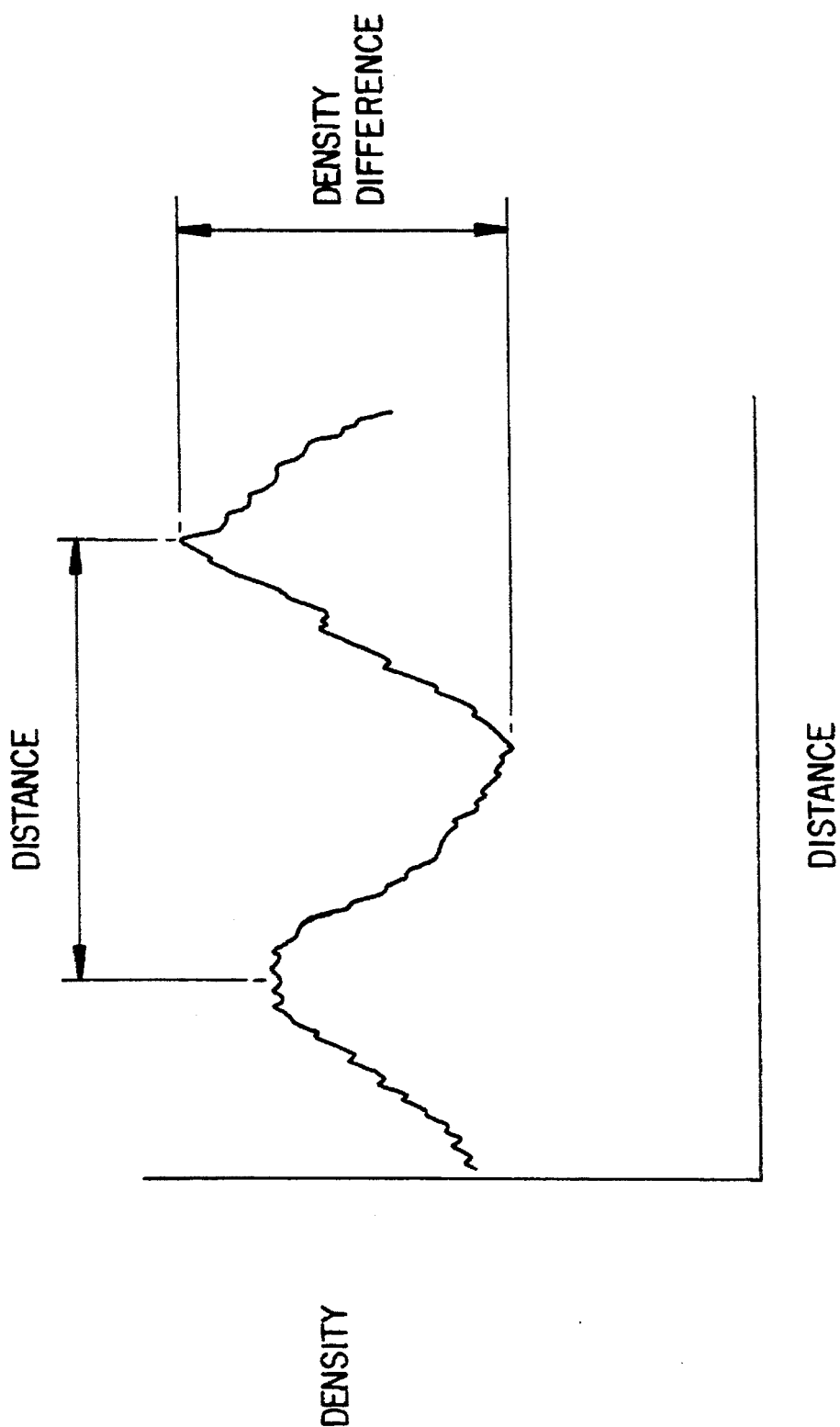
FIG. 2 is a graph showing a part of the density distribution profile for a hydrogen-absorbing alloy in accordance with a first embodiment of the present invention.

In experiment 1-1, a relationship between a Manganese (Mn) density difference and a density pitch in the alloy was tested, and the results are shown in table 1. The density pitch is the distance between two adjacent high density peaks. In the experiment 1-1, a distance between portions of two adjacent segregated elements in the hydrogen-absorbing alloy is measured in a 2 µm³ volume by linear analysis methods. FIG. 2 graphically illustrates the relationship between the density difference and the density pitch (distance). In FIG. 2 a horizontal line represents the density pitch (the distance between the two adjacent high density peaks) and a vertical line represents a density difference for one of the elements. Therefore, a height for one of the density peaks defines the density differences.

As shown in table 1, the alloys "a1" and "a2" of the present invention have enlarged Manganese (Mn) density differences and exhibit density pitches, which are spread out. In the alloys "a1" and "a2", the density differences are not less than about 3.0 wt % and the density pitches are not less than about 20 µm, respectively.

TABLE 1

| Alloy | Density difference (wt %) | Density pitch (µm) |
|-------|---------------------------|--------------------|
| a1    | 3.0                       | 20                 |
| a2    | 5.7                       | 63                 |
| x     | 1.1                       | less than 15       |

Experiment 1-2

Experiment 1-2 test the discharge capacities of batteries "A1", "A2" and "X". The batteries used the corresponding alloys "a1", "a2" and "x" for the negative electrode and the experiment 1-2 results are shown in table 2. The discharge capacity of the battery was measured at a low temperature at −20° C. To conduct the experiment, each battery is charged at room temperature at 1° C. rate to provide a full-charge. Next, the battery is cooled to −20° C. and the battery is discharged until a 0.8 V battery voltage is measured. In table 2, a discharge capacity at 20° C. (room temperature) is 100%.

TABLE 2

| Alloy | Battery | Discharge capacity (%) |
|-------|---------|------------------------|
| a1    | A1      | 32                     |
| a2    | A2      | 64                     |
| x     | X       | 5                      |

As shown in table 2, the batteries "A1" and "A2" of the present invention have excellent capacities, compared to the battery "X" from the comparative example.

Experiment 1-3

Figure 3:
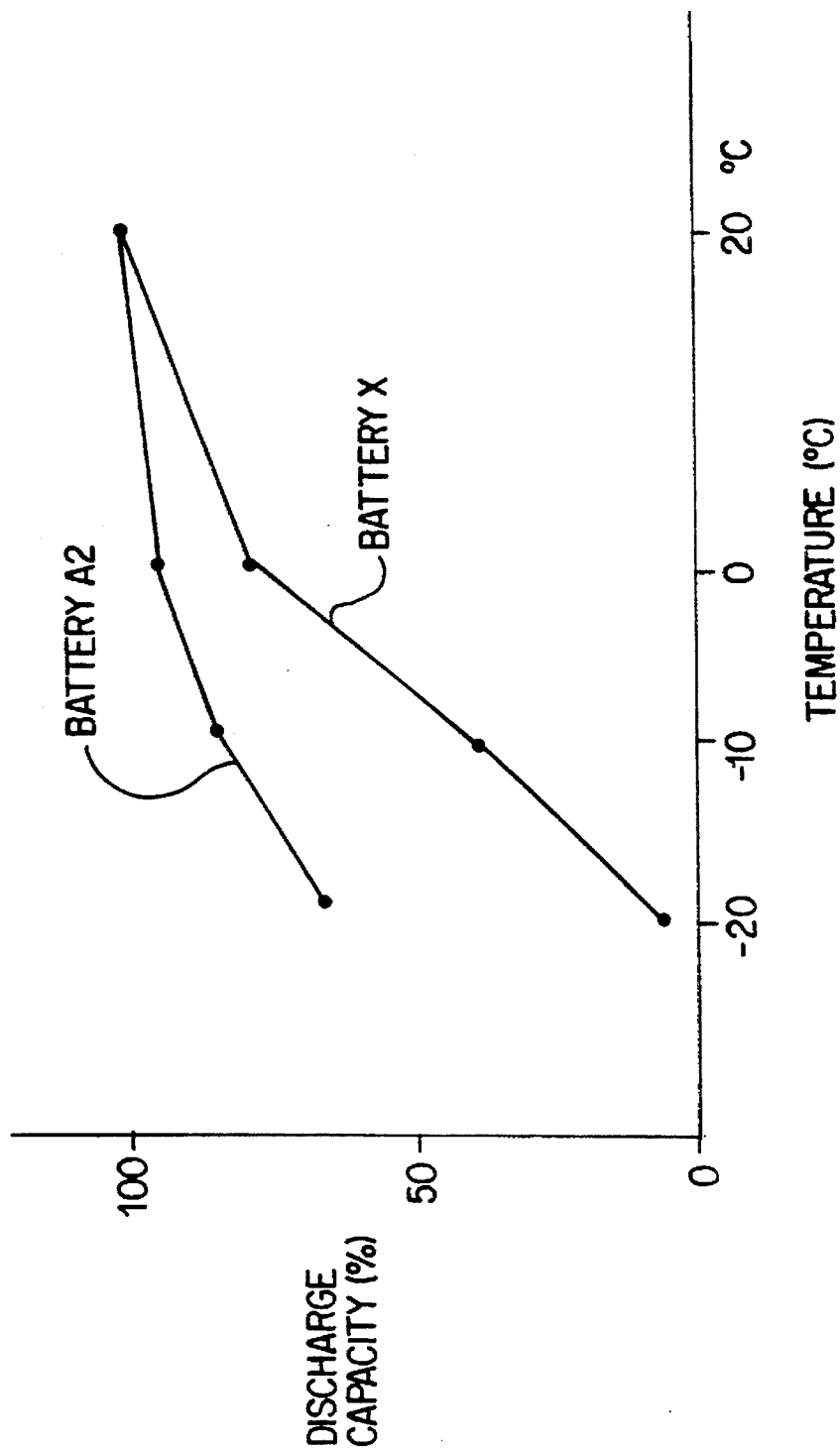
FIG. 3 is a graph showing the relationship between temperature and the discharge capacity of a battery in accordance with a first embodiment of the present invention.

Experiment 1-3 tested a relationship between discharge temperature and discharge capacity for the batteries "A2" and "X". The batteries used the corresponding alloys "a2" and "x" for the negative electrode and the experimental results are shown in FIG. 3. The discharge capacity for each battery was measured by changing the discharge temperature. As shown in FIG. 3, a discharge capacity at 20° C. (room temperature) is 100%. FIG. 3 shows that reducing the discharge temperature has a lesser affect on the discharge capacity for the batteries "A1" and "A2" compared to the battery "X" from the comparative example.

Experiment 1-4

Figure 4:
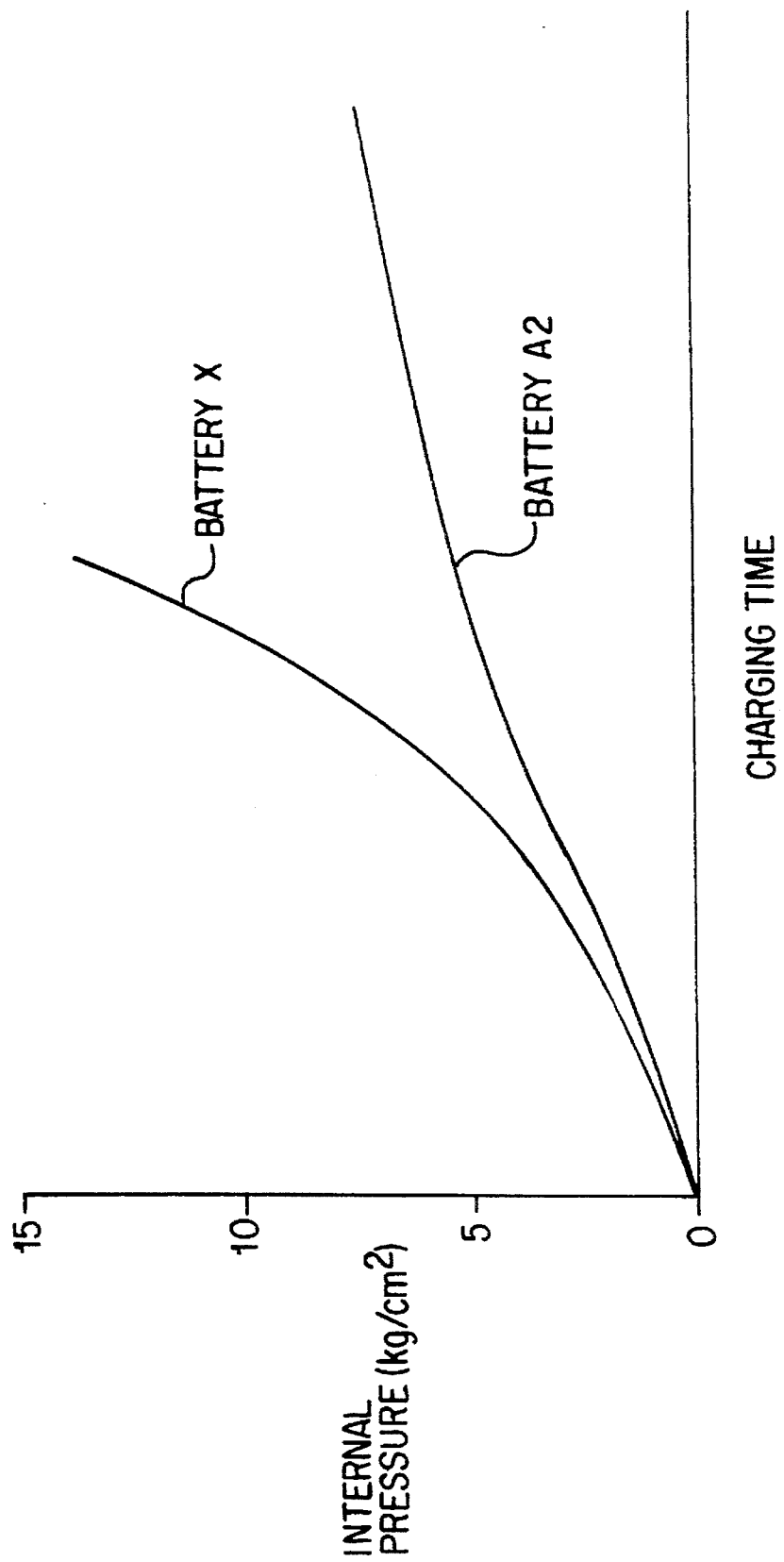
FIG. 4 is a graph showing the relationship between the charging time and an internal pressure of a battery in accordance with a first embodiment of the present invention.

Experiment 1-4 tested a relationship between charging time and internal pressure of the batteries "A2" and "X". The batteries used the corresponding alloys "a2" and "x" for the negative electrode and the experimental results are shown in FIG. 4. The charging current for this experiment was set at a 2 C rate. As shown in FIG. 4, the battery "A2" of the present invention has a significantly smaller internal pressure increase from rapid charging as compared to the battery "X".

Experiment 1-5

Figure 5:
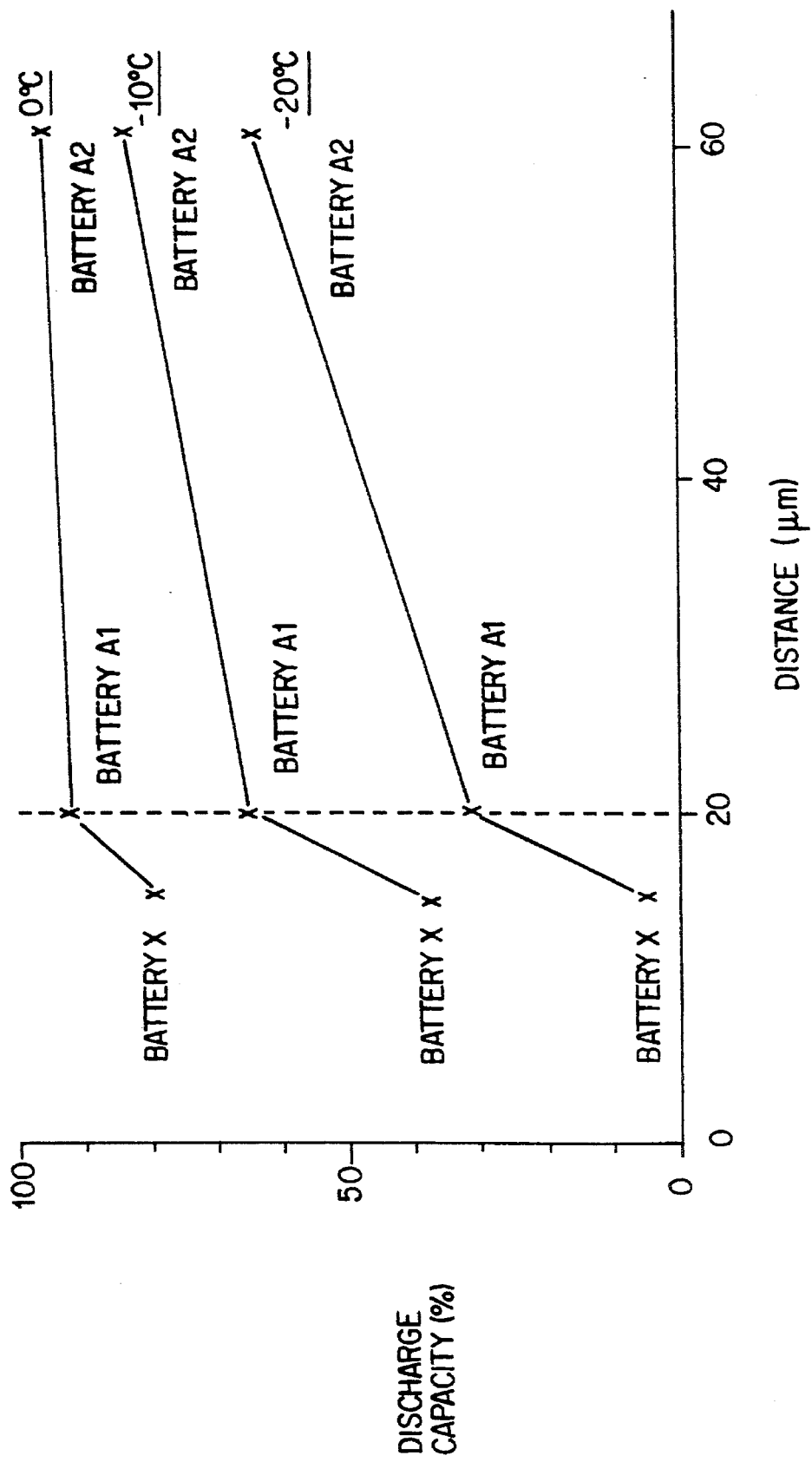
FIG. 5 is a graph showing the relationship between the distance between two adjacent high density peaks and a discharge capacity of a battery in accordance with a first embodiment of the present invention.

Experiment 1-5 determined a relationship between density pitch and a discharge capacity for the batteries "A1", "A2" and "X". The batteries used the corresponding alloys "a1", "a2" and "x" for the negative electrodes and the experimental results are shown in FIG. 5. The battery discharge is performed at various temperatures which are changed from 0° C., to −10° C. and to −20° C. Each discharge capacity is compared to a discharge capacity at 25° C. which represents a 100% discharge capacity. FIG. 5 shows that the batteries "A1" and "A2" of the present invention are less susceptible to discharge capacity reduction from low temperature discharging as compared to the battery "X".

Experiment 1-6

Figure 6:
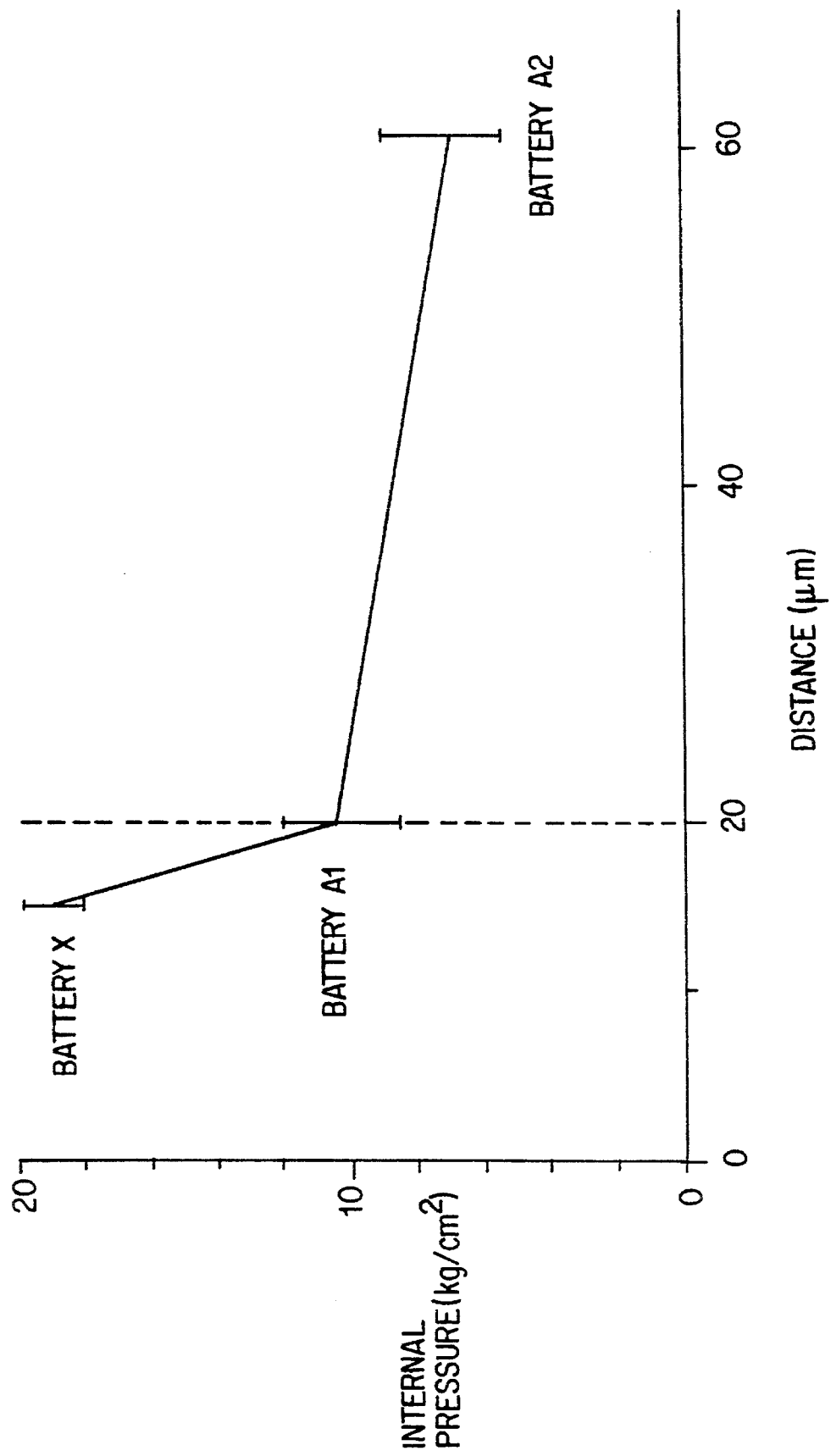
FIG. 6 is a graph showing the relationship between the distance between the two adjacent high density peaks and internal pressure of a battery in accordance with a first embodiment of the present invention.

Experiment 1-6 tested a relationship between density pitch and internal pressure for the batteries "A1", "A2" and "X" and the experimental results are shown in FIG. 6. For this experiment, the batteries are charged at a 1C rate to 200% the normal charging capacity of the battery, and then the internal pressure for each battery is compared. FIG. 6 shows that the batteries "A1" and "A2" of the present invention have a significantly smaller internal pressure increase as compared to the battery "X".

The results of above experiments, 1-1 to 1-6, show that a density pitch between two adjacent portions are preferably greater than about 20 µm.

SECOND EMBODIMENT

First Example

In a second embodiment of the present invention, the hydrogen-absorbing alloy is prepared with Mm (Misch metal), Nickel (Ni), Cobalt (Co), Aluminum (Al) and Manganese (Mn) being measured in an element ratio of 1:3.2:0.8:0.2:0.8. These elements are mixed and melted in accordance with the same method used in the first embodiment. This produces a hydrogen-absorbing alloy "b1" represented by the formula $MmNi_{3.2}Co_{0.8}Al_{0.2}Mn_{0.8}$. This alloy is used as a negative electrode and to produce a battery "B1".

SECOND EXAMPLE

A second example of the second embodiment is similar to the above described first example of the second embodiment, however, the quenching speed is altered. The quenching speed is set higher than 500° C./min after the slow-cooling to the nucleus formation temperature. This produces a hydrogen-absorbing alloy bulk having a composition represented by the formula $MmNi_{3.2}Co_{0.8}Al_{0.2}Mn_{0.8}$, and which is called "b2".

The hydrogen-absorbing alloy "b2" is used to produce a negative electrode and then battery "B2" using the same method used for the first example.

COMPARATIVE EXAMPLE

A comparative example is produced for comparison with the first and second examples. To produce the comparative example, both the slow-cooling speed and quenching speed are set to less than 300° C./min. This produces a hydrogen-absorbing alloy bulk having the same elements as described in the first example. This alloy is called "y". The hydrogen-absorbing alloy "y" is used to produce a negative electrode and then a battery "Y" is prepared by the same method used in the first example.

EXPERIMENTS

Several experiments were performed on the above battery examples. The purpose was to determine the battery characteristics and to compare the battery example. Below is a description of the experiments performed.

Experiment 2-1

In experiment 2-1, a relationship between a Manganese (Mn) density difference and a density pitch was tested, and the results are shown in table 3. As shown in table 3, the alloys "b1" and "b2" of the present invention have enlarged Manganese (Mn) density differences and define density pitches which are spread out In the alloys "b1" and "b2" the density differences are not less than about 3.2 wt % and the density pitches are not less than about 42 μm, respectively.

TABLE 3

| Alloy | Density difference (wt %) | Density pitch (μm) |
|---|---|---|
| b1 | 3.2 | 42 |
| b2 | 6.0 | 88 |
| y | 1.3 | less than 18 |

Experiment 2-2

Experiment 2-1 tested the discharge capacities of batteries "B1" "B2" and "Y". The batteries used the corresponding alloys "b1", "b2" and "y" for the negative electrode and the experimental results are shown in table 4. The discharge capacity of the batteries is measured at low temperature at −20° C. Typical conditions for the measurements in this experiment are set to the same conditions as those used in experiment 1-2.

TABLE 4

| Alloy | Battery | Discharge capacity (%) |
|---|---|---|
| b1 | B1 | 38 |
| b2 | B2 | 70 |
| Y | Y | 3 |

As shown in the table 4, the batteries "B1" and "B2" of the present invention have excellent capacities, compared to the battery "Y" from the comparative example.

THIRD EMBODIMENT

FIRST EXAMPLE

In a third embodiment of the present invention, the hydrogen-absorbing alloy is prepared with Mm (Misch metal), Nickel (Ni), Cobalt (Co), Aluminum (Al) and Manganese (Mn) being measured in an element ratio of 1:3.1:0.9:0.2:0.6. These elements melted, and cooled using a cooling speed and a quenching Speed less than 300° C./min in accordance with the same method used by the first embodiment. This produces a hydrogen-absorbing alloy "c" represented by the formula $MmNi_{3.2}Co_{1.0}Al_{0.2}Mn_{0.6}$. This alloy is used as a negative electrode and to produce a battery "C". The produced hydrogen-absorbing alloy has a non-stoichiometric composition ratio.

COMPARATIVE EXAMPLE

A comparative example using the alloy "x" is used to produce a battery "X" in accordance with the comparative example of the first embodiment.

EXPERIMENTS

Several experiments were performed on the above battery examples. The purpose was to determine the battery characteristics and to compare the battery example. Below is a description of the experiments performed.

Experiment 3-1

In experiment 3-1, a relationship between a Manganese (Mn) density difference and a density pitch was tested and typical results are shown in table 5. The conditions for the measurements in this experiment are the same as the conditions used in experiment 1-1. As shown in table 5, the alloy "c" of the present invention has an enlarged Manganese (Mn) density differences and defines a density pitch, which is spread out. In the alloy "c", the density difference is less than about 10 wt % and the density pitch is not less than about 97 μm, respectively.

TABLE 5

| Alloy | Density difference (wt %) | Density pitch (μm) |
|---|---|---|
| c | 10 | 97 |
| x | 1.1 | less than 15 |

Experiment 3-2

Experiment 3-2 tested the discharge capacities of the batteries "C" and "X". The batteries used the corresponding alloys "c" and "x" for the negative electrode and experimental results are shown in table 6. The discharge capacities of the battery are measured at a low temperature at −20° C. Typical conditions for the measurements in this experiment are set to the same conditions as those used in experiment 1-2.

TABLE 6

| Alloy | Battery | Discharge capacity (%) |
|---|---|---|
| c | C | 75 |
| x | X | 5 |

As shown in table 6, the battery "C" of the present invention has an excellent capacity, compared to the battery "X" of the comparative example.

Experiment 3-3

Figure 7:
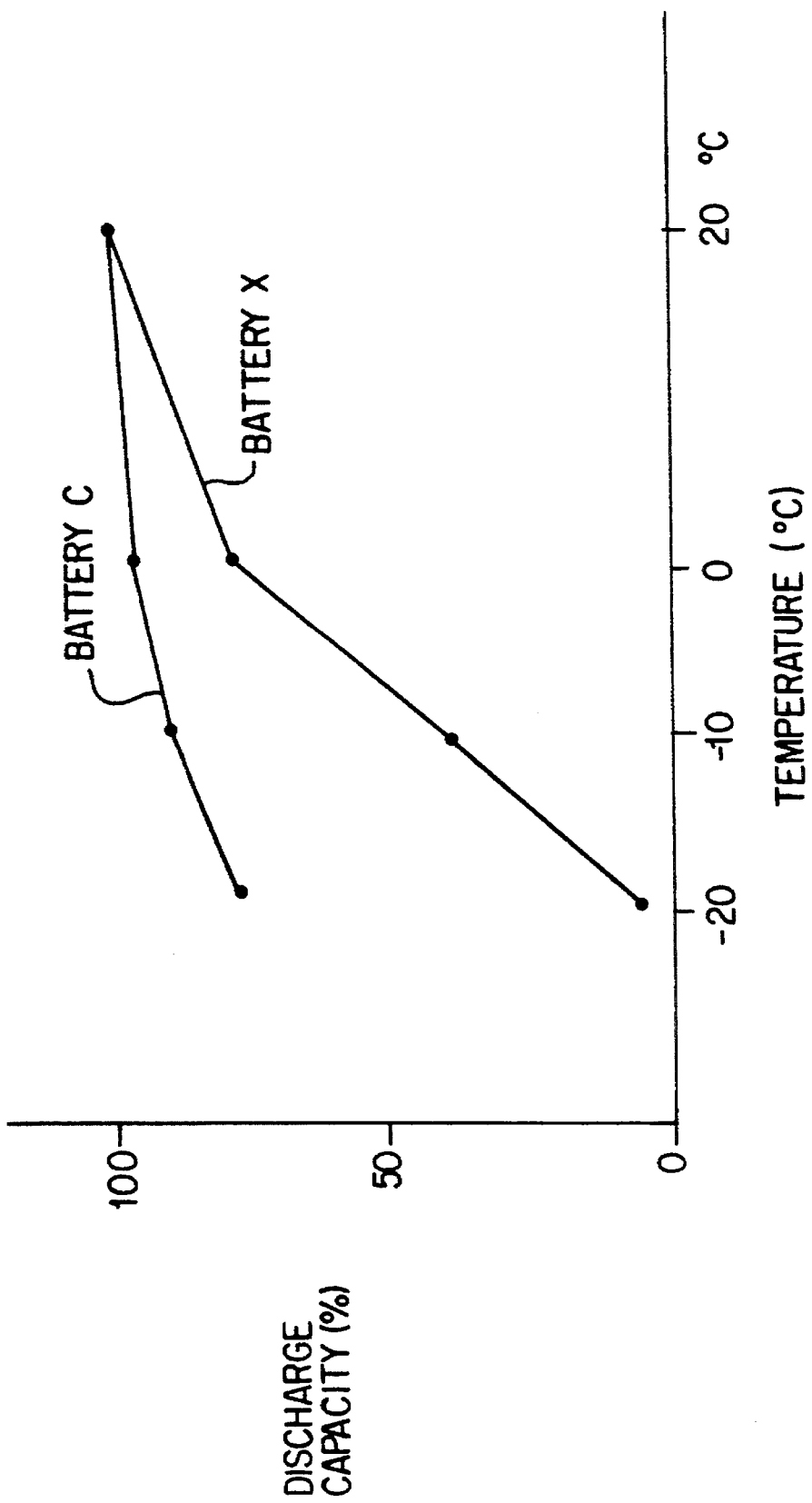
FIG. 7 is a graph showing the relationship between temperature of a battery and the discharge capacity in accordance with a further embodiment of the present invention.

Experiment 3-3 tested a relationship between discharge temperature and discharge capacities for the batteries "C" and "X". The batteries used the corresponding alloys "c" and "x" for the negative electrode and the experimental results are shown in FIG. 7. Typical conditions for experiment 3-3 are set to the same as those used in experiment 1-3. In FIG. 7 shows that reducing the discharge temperature has a lesser affect on the discharge capacity for the battery "C" compared to the battery "X".

Experiment 3-4

Figure 8:
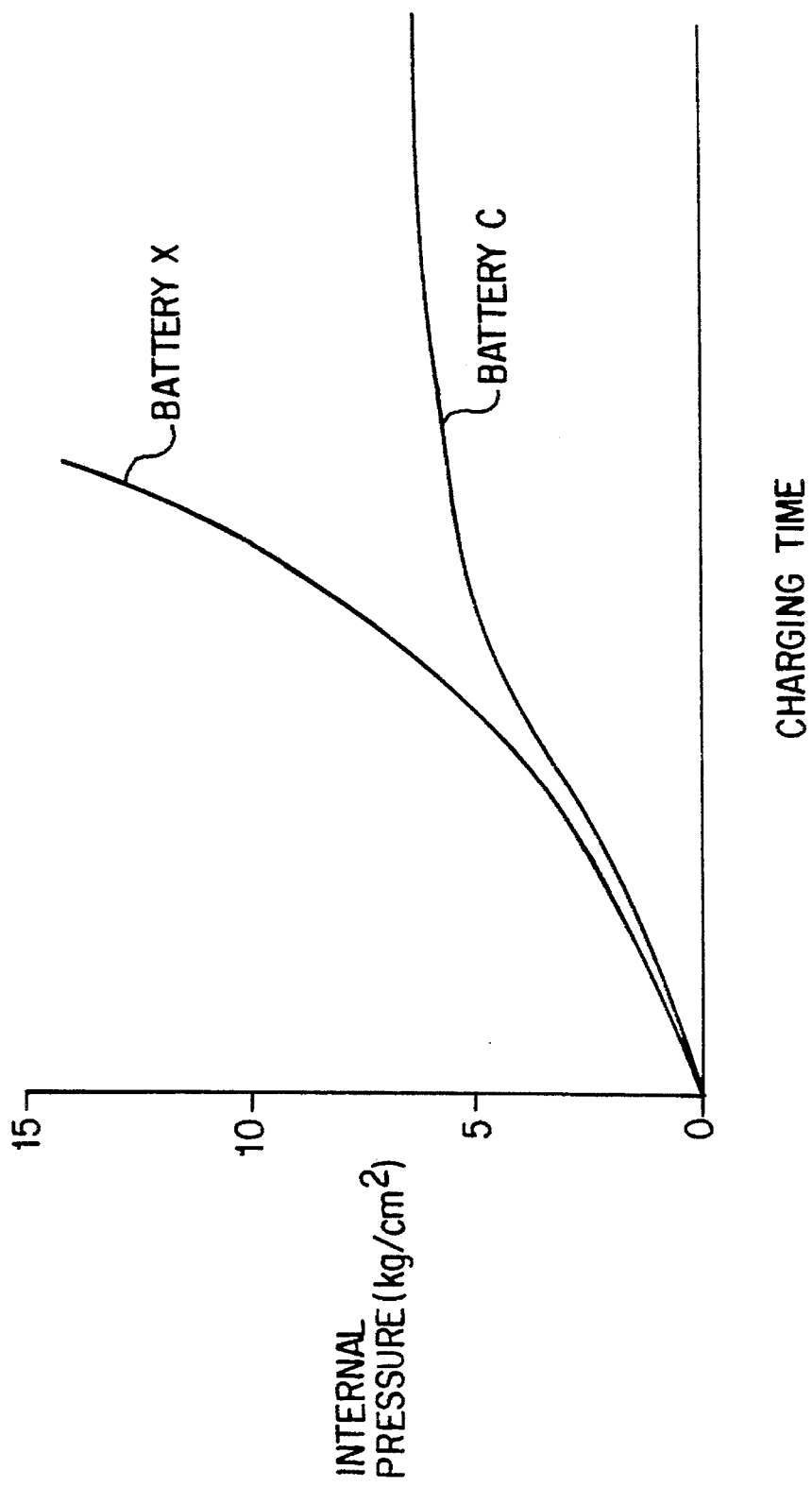
FIG. 8 is a graph showing the relationship between the charging time and internal pressure of a battery in accordance with a further embodiment of the present invention.

Experiment 3-4 tested a relationship between changing time and internal pressure of the batteries "C" and "X". The batteries used the corresponding alloys "c" and "x" for the negative electrode and the experimental results are shown in FIG. 8. Typical conditions for experiment 3-4 are set to the same as those used in experiment 1-4. As shown in FIG. 8, the battery "C" of the present invention has a significantly smaller internal pressure increase from rapid charging as compared to the battery "X" of the comparative example.

Experiment 3-5

Figure 9:
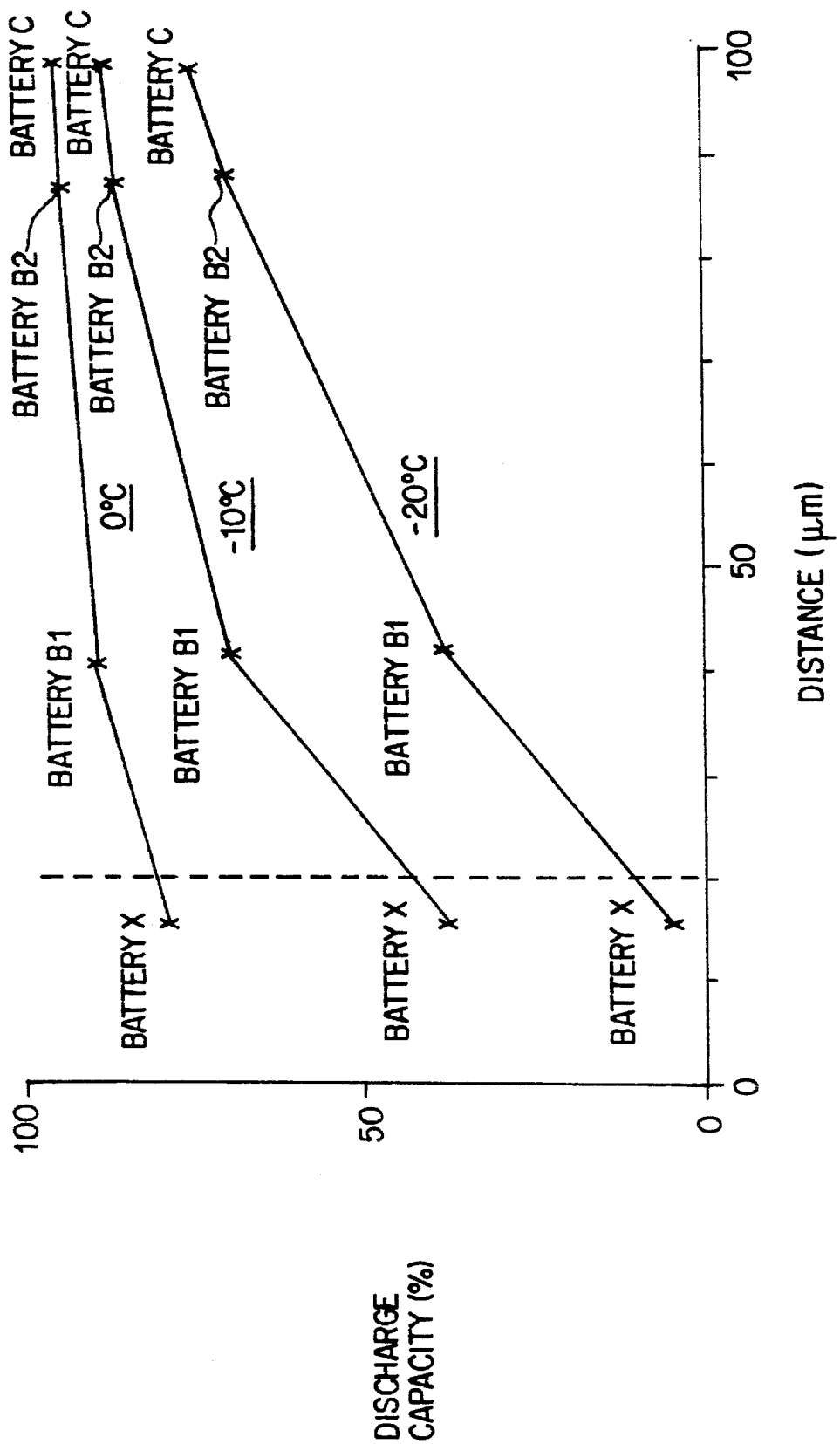
FIG. 9 is a graph showing the relationship between the discharge between the two adjacent high density peaks and a discharge capacity of a battery in accordance with said further embodiment of the present invention.

Experiment 3-5 tested a relationship between density pitch and a discharge capacity of the batteries "C", "B1", "B2" and "X". The batteries used the corresponding alloys "c", "b1", "b2" and "x" for the negative electrode and the experimental results are shown in FIG. 9. The batteries "B1" and "B2" are prepared in accordance with the above described second embodiment. The battery discharge is performed at various temperatures which are from changed from 0° C., to −10° C. and to −20° C. Each discharge capacity is compared to a discharge capacity at 25° C. which represents a 100% discharge capacity. FIG. 9 shows that the batteries "C", "B1" and "B2" of the present invention are less susceptible to discharge capacity reduction from such low temperature discharging as compared to the battery "X".

Experiment 3-6

Figure 10:
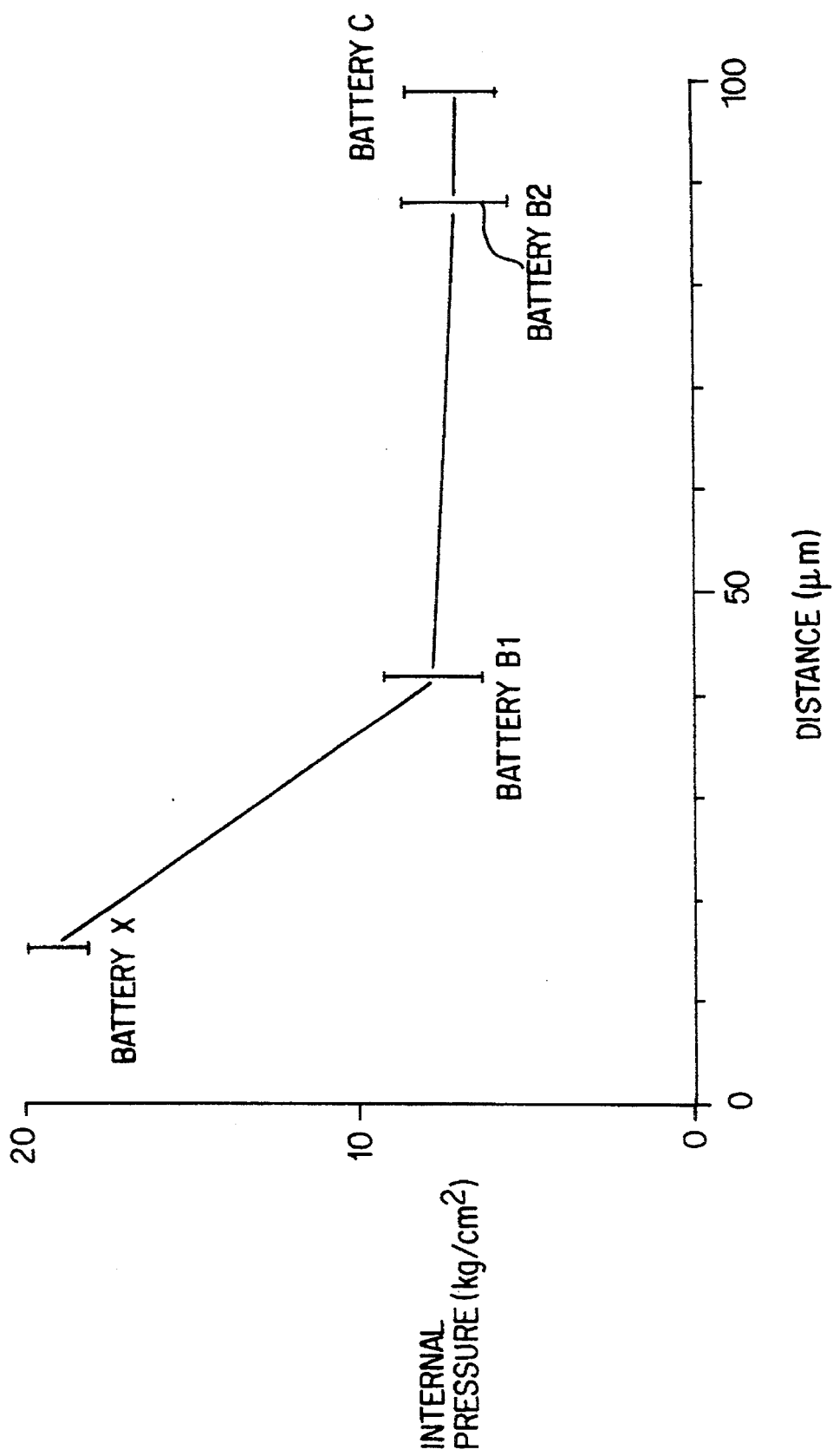
FIG. 10 is a graph showing the relationship between the distance the two adjacent high density peaks and internal pressure of a battery in accordance with said further embodiment of the present invention.

Experiment 3-6 tested a relationship between density pitch and internal pressure for the batteries "C", "B1", "B2" and "X" and the experimental results are shown in FIG. 10. For this experiment, the batteries are charged at a 1C rate to 200% the normal charging capacity of the battery, and then internal pressure for each battery is compared. FIG. 10 shows that the batteries "C", "B1" and "B2" of the present invention have a significantly smaller increase in internal pressure as compared to the battery "X".

The results of the above experiments, 3-1 to 3-6, show that the density pitch is more preferable more than about 40 μm.

FOURTH EMBODIMENT

First Example

In a fourth embodiment of the present invention, the hydrogen-absorbing alloy is prepared with Mm (Misch metal), Nickel (Ni), Cobalt (Co), Aluminum (Al), Manganese (Mn) and an additive of Boron (B) being measured in an element ratio of 1:3.1:0.9:0.2:0.6:0.1. These elements are then melted, and cooled using a cooling speed and a quenching speed less than 300° C./min in accordance with the same method used by the first embodiment. This produces a hydrogen-absorbing alloy "d1" which is represented by the formula $MmNi_{3.1}Co_{0.9}Al_{0.2}Mn_{0.6}B_{0.1}$. This alloy is used as a negative electrode and to produce a battery "D1".

SECOND EXAMPLE

In a second example of the fourth embodiment Tungsten (W) is used as an additive which replace the Boron in the first example. This produces a hydrogen-absorbing alloy bulk having a composition represented by the formula $MmNi_{3.1}Co_{0.9}Al_{0.2}Mn_{0.6}W_{0.1}$ and which is called "d2". The hydrogen-absorbing alloy "d2" is used to produce a negative electrode, and then battery "D2" using the same method used by the first example.

THIRD EXAMPLE

In a third example of the fourth embodiment, Molybdenum (Mo) is used as an additive which replaces the Boron in the first example. This produces a hydrogen-absorbing alloy bulk having a composition represented by the formula $MmNi_{3.1}Co_{0.9}Al_{0.2}Mn_{0.6}Mo_{0.1}$ and which is called "d3". Thy hydrogen-absorbing alloy "d3" is used to produce a negative electrode and then battery "D3" using the same method used by the first example.

COMPARATIVE EXAMPLE

A comparative example using the alloy "x" is used to produce a battery "X" in accordance with the comparative example of the first embodiment.

EXPERIMENTS

Several experiments were performed on the above battery examples. The purpose was to determine the battery characteristics and to compare the battery example. Below is a description of the experiments performed.

Experiment 4-1

In experiment 4-1, a relationship between a Manganese (Mn) or Cobalt (Co) density difference and a density pitch was tested, typical results are shown in table 7. The conditions for the measurements in this experiment are the same as the conditions used in experiment 1-1. As shown in table 7, the alloys "d1", "d2" and "d3" of the present invention have enlarged Manganese (Mn) or Cobalt (Co) density differences and define density pitches which are spread out. In the alloys "d1", "d2" and "d3", the density difference is not less than about 6.0 wt % and the density pitch is not less than about 50 μm, respectively.

TABLE 7

| Alloy | Density difference of Mn (wt %) | Density difference of Co (wt %) | Density pitch (μm) |
|---|---|---|---|
| d1 | — | 6.0 | 50 |
| d2 | 8.6 | — | 63 |
| d3 | 7.1 | — | 64 |
| x | 1.1 | — | 15 |

Experiment 4-2

Experiment 4-2 determined the discharge capacities of batteries "D1", "D2", "D3" and "X". The batteries used the corresponding alloys "d1", "d2", "d3" and "x" for the negative electrode and the experimental results are shown in table 8. The discharge capacity of the battery is measured at a low temperature at −20° C. Typical conditions for the measurements in this experiment are set to the same conditions as those used in experiment 1-2.

TABLE 8

| Alloy | Battery | Discharge capacity (%) |
|---|---|---|
| d1 | D1 | 69 |
| d2 | D2 | 72 |
| d3 | D3 | 74 |
| x | X | 5 |

As shown in table 8, the batteries "D1", D2" and "D3" of the present invention have excellent capacities compared to the battery "X" of the comparative example.

While the above description refers to particular embodiments of the present invention, it will be understood that modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of the equivalency of the claims are therefore intended to be embraced therein.

What is claimed is:

1. A method for manufacturing a hydrogen-absorbing alloy electrode, comprising the steps of:

preparing a combination of materials for a hydrogen-absorbing alloy having one of a formula selected from $ANi_aCo_bMn_c$ and $ANi_aCo_bMn_cX_d$, in said formula A being a Misch Metal or mixture of rare earth elements including Lanthanum, the ranges of "a", "b", "c" and "d" being respectively defined by $2.5 \leq a \leq 3.5$, $0 \leq b \leq 1.5$, $0 \leq c \leq 1.0$ and $0 < d \leq 0.3$, the value of a+b+c in the formula $ANi_aCo_bMn_c$ being 3.85 to 5 and the value of a+b+c+d in the formula $ANi_aCo_bMn_cX_d$ being 3.85 to 5, in said formula $ANi_aCo_bMn_cX_d$ X is an element selected from the group consisting of of Iron (Fe), Copper (Cu), Molybdenum (Mo), Tungsten (W), Boron (B), Aluminum (Al), Silicon (Si) and Tin (Sn);

melting said materials to obtain a melted mixture;

cooling said melted mixture at a first cooling speed until a nucleus formation temperature is reached;

quenching at a second cooling speed faster than said first cooling speed to produce said hydrogen-absorbing alloy; and placing said hydrogen-absorbing alloy on a conductive substrate, whereby said hydrogen-absorbing alloy is composed of at least three elements, one of said at least three elements has a density distribution profile, said density distribution profile having at least two adjacent high density peaks and a lowest density point between said at least two adjacent high density peaks, wherein a density difference between one of said at least two adjacent high density peaks and said lowest density point is not less than 3.0 wt % and a distance between said two adjacent high density peaks is not less than 20 μm.

2. A method for manufacturing a hydrogen-absorbing alloy electrode according to claim 1, wherein said hydrogen-absorbing alloy has a hexagonal crystal system.

3. A method for manufacturing a hydrogen-absorbing alloy electrode according to claim 1, wherein said nucleus formation temperature ranges between about 1200° C. and about 1300° C.

4. A method for manufacturing a hydrogen-absorbing alloy electrode according to claim 1, wherein said second cooling speed is larger than 500° C./min.

5. A method for manufacturing a hydrogen-absorbing alloy electrode according to claim 1, wherein said first cooling speed and said second cooling speed are both smaller than about 300° C./min. such that nucleus formulation is facilitated.

* * * * *